INVENTOR.
WALTER M. POHL

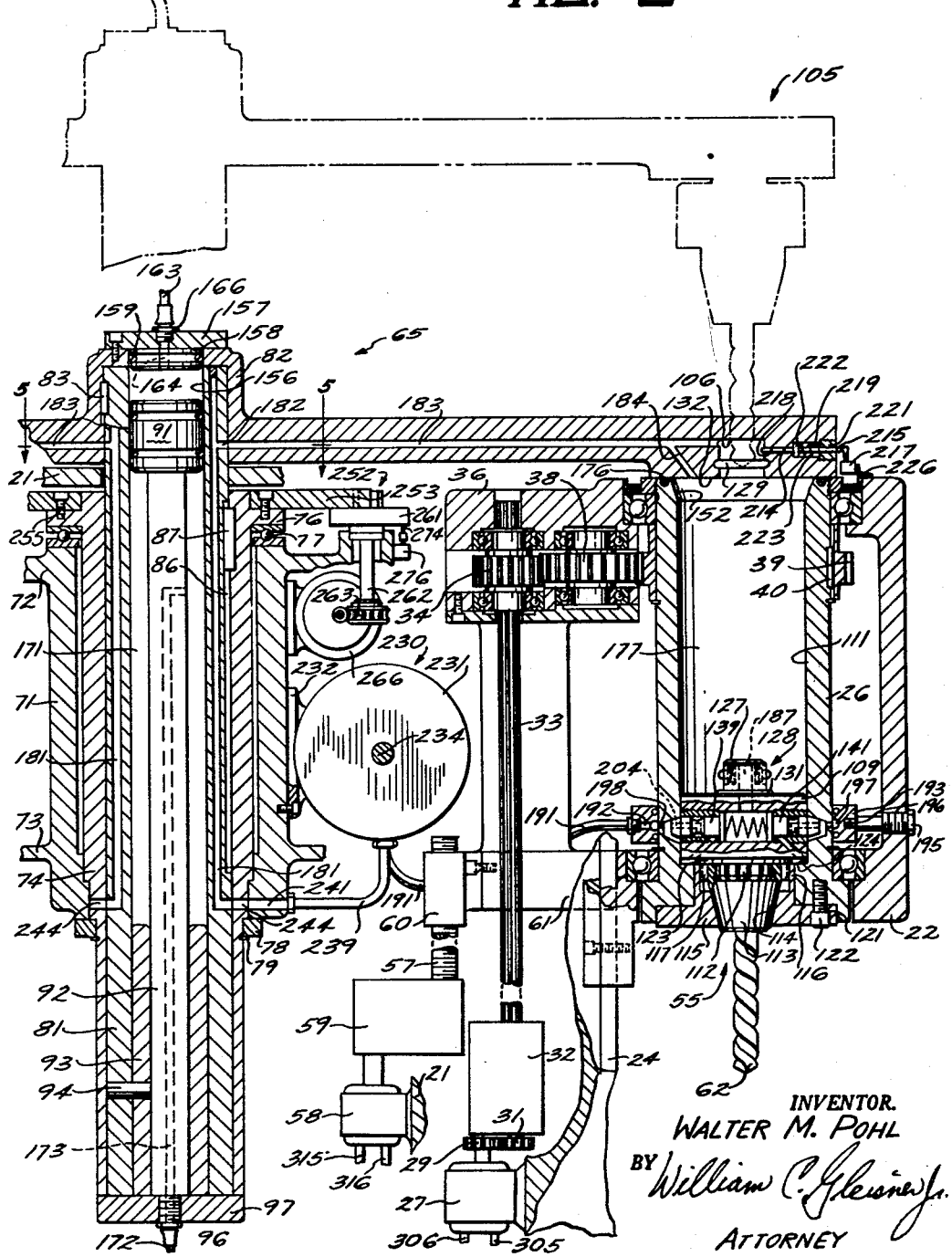

March 23, 1965 W. M. POHL 3,174,222
TOOL CHANGING MACHINE TOOL
Filed July 24, 1961 4 Sheets-Sheet 3
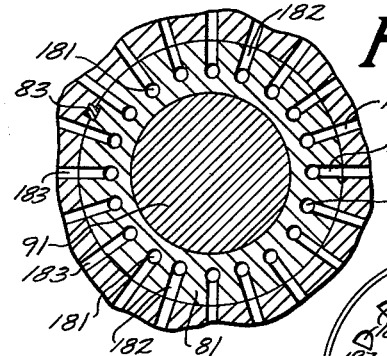
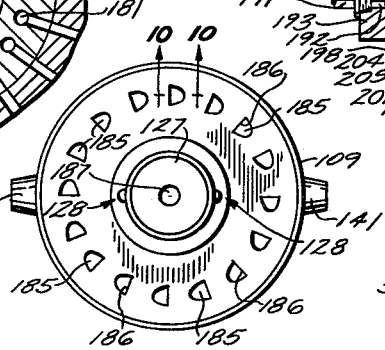
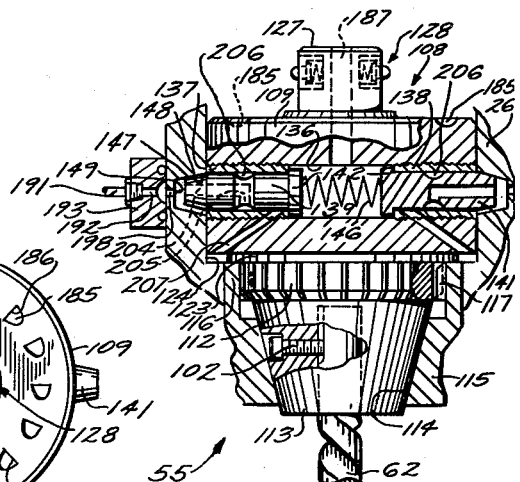
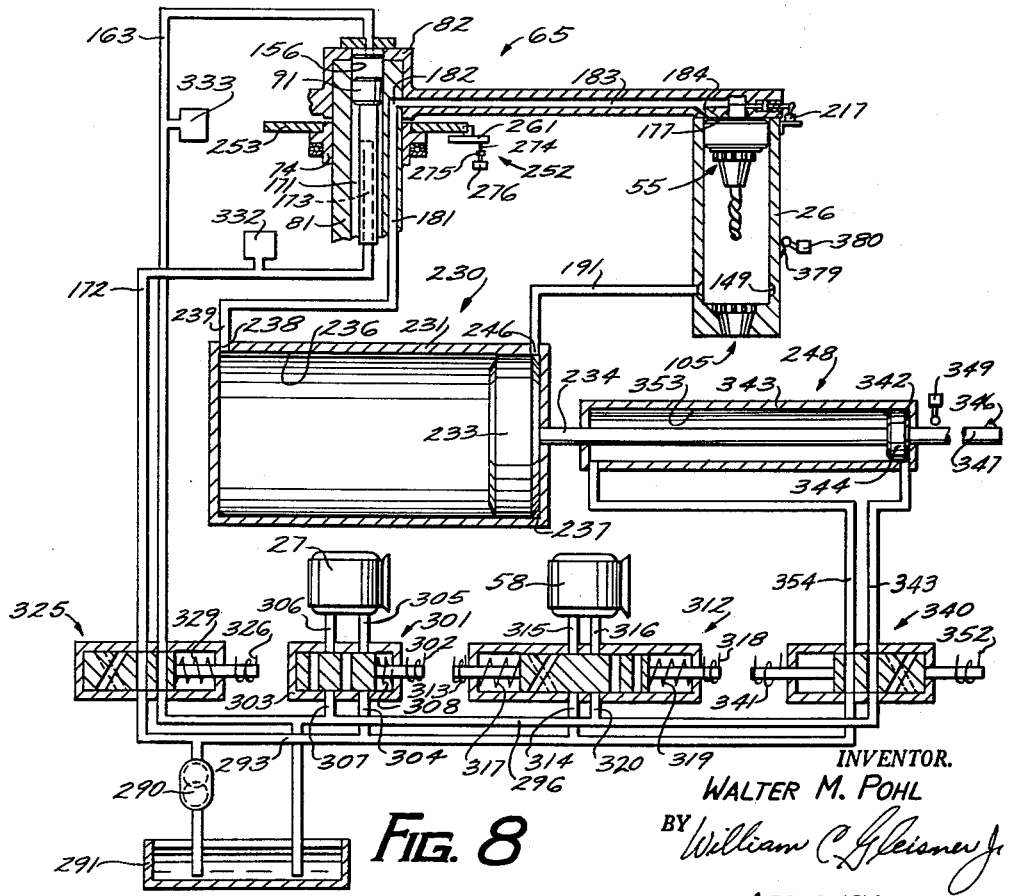
INVENTOR.
WALTER M. POHL
BY William C. Gleisner Jr.
ATTORNEY March 23, 1965 W. M. POHL 3,174,222
TOOL CHANGING MACHINE TOOL
Filed July 24, 1961 4 Sheets-Sheet 4

INVENTOR.
WALTER M. POHL
BY William C. Gleisner Jr.
ATTORNEY

United States Patent Office 3,174,222
Patented Mar. 23, 1965

3,174,222
TOOL CHANGING MACHINE TOOL
Walter M. Pohl, Boca Raton, Fla., assignor to Kearney & Trecker Corporation, West Allis, Wis., a corporation of Wisconsin
Filed July 24, 1961, Ser. No. 126,092
10 Claims. (Cl. 29—568)

The present invention relates generally to machine tools and more particularly to a machine tool having an improved automatically operated means which is operative to place a cutting tool in the spindle of the machine tool.

An object of the present invention is to provide a machine tool having a rotatable tool spindle and a cooperating tool storage magazine carried for relative bodily movement for interchanging tools therebetween.

Still another object of the present invention is to provide a machine tool with an improved tool change mechanism which operably carries a plurality of cutting tools for selective engagement in an operative work spindle.

Still another object of the present invention is to provide a tool change mechanism featuring breech loading of cutting tools in a work spindle.

A further object of the present invention is to provide an improved machine tool having a tool storage and changer mechanism in combination with a breech type spindle operated by air pressure for effecting a tool change.

Yet another object of the present invention is to provide a tool changer and cutting tool storage mechanism which is maintained in its operating position at all times so that the time required for effecting a tool change is reduced to a minimum.

A still further object of the present invention is to provide a novel combination of elements of a cutting tool storage device and an air operating spindle which cooperate to function as a tool changer.

Another object of the present invention is to provide a greatly simplified tool interchange device for a machine tool.

According to this invention, the machine tool is equipped with a rotary spindle and a plurality of cutting tools adapted to be received by the spindle for rotation with the latter to perform a machine operation. The cutting tools are stored in a turret or magazine carried by the machine tool frame for rotation in a plane transverse to the axis of the spindle for selective indexing movement, to position a desired cutting tool in alignment with the spindle. Thereafter, the storage turret is operable to insert the selected tool into the spindle in a breech type loading action. With the selected cutting tool located within the spindle, the storage turert serves as a breech block to seal the rear portion of the spindle to form a chamber to which air pressure can be supplied. The air pressure supplied to the chamber moves the tool from the storage turret into operative engagement with the spindle. To remove the tool from the spindle the source of the air pressure is reversed to create a vacuum in the seal chamber moving the tool into the storage turret. The storage turret is then operated to withdraw the tool from the spindel and move another selected tool into position for the next cycle of operation.

The foregoing and other objects of this invention, which will become more fully apparent from the following detailed description, may be achieved by means of the exemplifying apparatus depicted in and set forth in this specification in connection with the accompanying drawings, in which:

FIG. 2 is a detailed view in vertical section through the machine column, storage turret and spindle head illustrating the cooperating relationship between the operating parts taken along the plane represented by the line 2—2 in FIG. 1;

FIG. 3 is an enlarged fragmentary view in vertical section through the tool and spindle with parts broken away to show the operating elements thereof;

FIG. 4 is an enlarged plan view of the tool body showing the vanes milled in the top surface thereof taken along the plane represented by the line 5—5 in FIG. 2;

FIG. 5 is a fragmentary view in horizontal section through the storage turret and fixed piston and rotating shafts;

FIG. 8 is a diagrammatic view of the fluid circuits;

Figure 1:
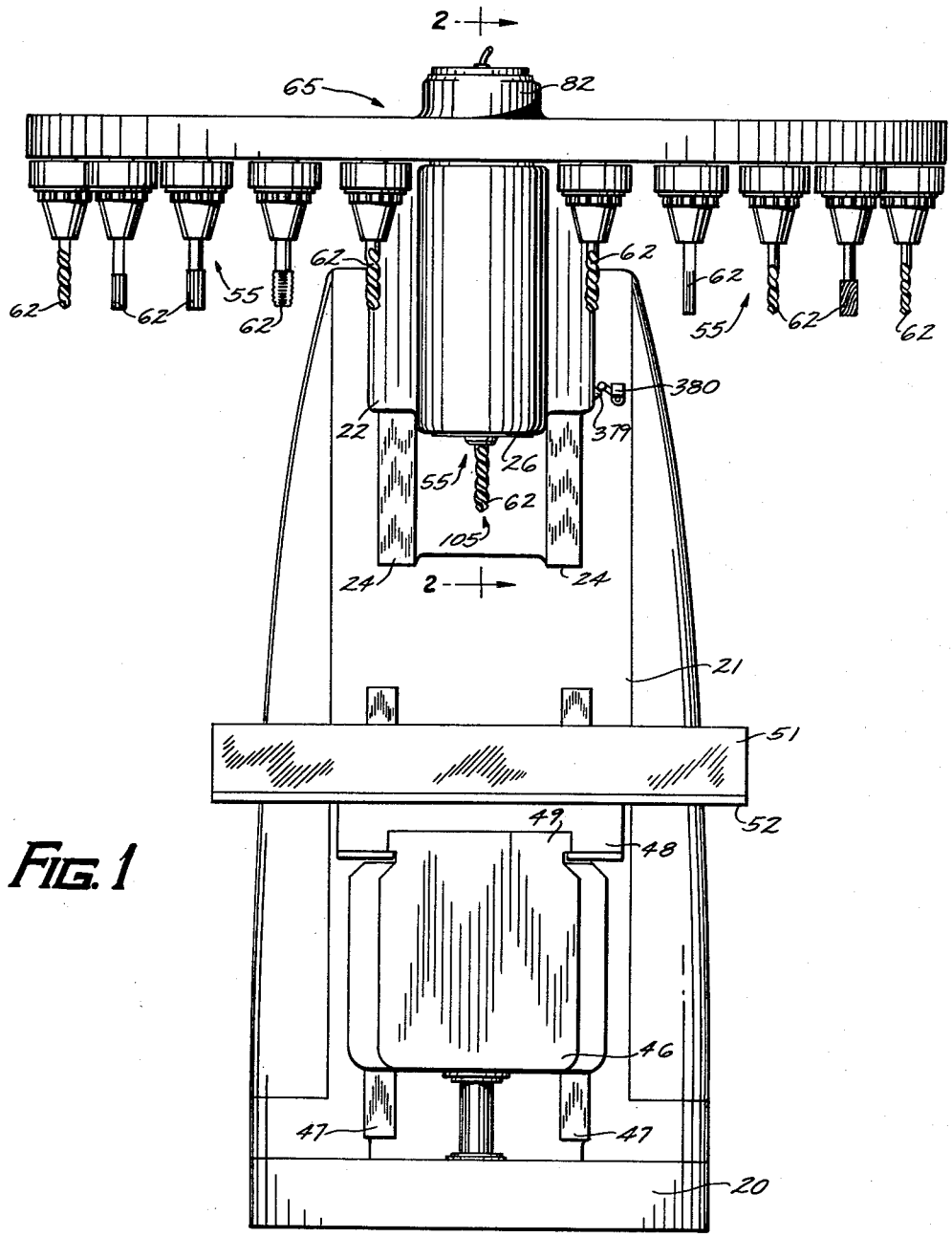
FIGURE 1 is a view in front elevation of a machine tool in which the features of the present invention are incorporated.

Reference is now made to the drawings and specifically to FIG. 1 thereof, illustrating a machine tool incorporating the features of the present invention. Although the machine tool illustrated is a drilling machine, it is to be understood that the novel features of the present invention may be incorporated in any other type of machine tool with equal effectiveness. The machine, shown in FIG. 1, comprises generally a base 20 having an upstanding hollow column 21 carrying at its upper forward end a spindle head 22 which is slidably mounted for vertical adjustment on ways 24 formed on the upper front surface of the column 21. A tool carrying spindle 26 is rotatably supported in the spindle head 22 and is power driven by an hydraulic motor 27 located within the hollow column, FIG. 2. A gear 29 secured to the drive shaft of the motor 27 is disposed in meshing engagement with a power input gear 31 of a variable speed transmission 32 that may be of any well known type. The transmission 32 is connected to rotatably drive a spline shaft 33 which extends upwardly from the transmission case 32. A gear 34 rotatably journaled in an internal upper web 36 formed in the spindle head 22 is disposed in slidably splined engagement with the spline shaft 33. Thus, the spline shaft 33 is operative to drive the gear 34 in any vertical adjusted position of the spindle head 22. The gear 34 is in meshing engagement with an idler gear 38 that is rotatably journaled in the web 36 and which, in turn, is disposed in meshing engagement with a spindle drive ring gear 39 keyed to the periphery of the spindle 26.

Beneath the spindle head 22 is arranged the usual work-supporting structure consisting of movable elements including a knee 46 slidably mounted for vertical adjustment along ways 47 formed on the lower front base of the column 21. The knee 46 is arranged to carry on its upper surface a saddle 48 slidably mounted for horizontal cross-feeding movement relative to the column on ways 49 formed on the upper surface of the knee 46. The saddle 48 carries a work-supporting table 51 slidably mounted on ways 52 for longitudinal feeding or positioning movement relative to a cutting tool 55 operatively disposed in the spindle 26.

Vertical feeding movement of the spindle head 22 is effected by rotating a screw 57, shown in FIG. 2, which is operatively connected to be selectively driven in one direction or the other by a motor 58 that is secured to an internal section of the column 21. The motor 58 is operatively connected to drive a feed transmission 59 which, in turn, is operatively connected to drive the screw 57. The screw 57 is threadedly engaged in a nut 60 that is secured to an inwardly extending bracket 61 integrally formed with the spindle head 22, as shown in FIG. 2. Thus, rotation of the screw 57 will effect movement of the nut 60 for effecting vertical adjustment of the spindle head 22.

The machine tool illustrated in FIG. 1, is operative to selectively change cutting tools in the spindle 26 for performing various cutting operations. To this end, a plurality of tools 55, each having a different cutter 62, are stored and carried by a storage turret or magazine, generally identified by the reference numeral 65. The magazine 65 is supported by the column 21 for rotation for the purpose of moving the magazine in an indexing movement for selectively positioning the cutting tools carried thereby in axial alignment with the spindle 26. In order to effect indexable rotation of the magazine 65, it is necessary that the magazine be elevated from the position it occupies, as shown in full lines in FIG. 2, to the position illustrated by the broken lines. Elevating the magazine effects like upward movement of the tools in a manner that the latter clear both the spindle head and the upper portion of the column. Thus, after being elevated, the magazine is then indexable to bring the next tool into alignment with the spindle for subsequent insertion of that tool into the spindle upon lowering the magazine.

To support the magazine 65 for both rotational and translational movement, the column 21 is provided with a depending tubular support 71 which is maintained in vertical position by means of internal webs 72 and 73 formed in the column. A tubular elongated driving sleeve 74 having a radially extending flange 76 is journaled within the bore of the support 71 with the flange engaging an antifriction thrust bearing 77. A retaining ring 78 is disposed about the lower reduced portion of the sleeve 74 and abuts against the bottom axial face of the tubular support 71 and is retained in that position by means of a snap ring 79 that is engaged in a suitable annular groove formed in the periphery of the lower portion of the sleeve. Thus, the sleeve 74 is supported within the tubular support 71 for rotation but is maintained axially fixed therein. An elongated tubular shaft 81 is disposed within the tubular driving sleeve 74 and extends upwardly through the top surface of the column 21 into a hub 82 of the storage turret or magazine 65. A driving connection between the shaft 81 and the circular storage turret or magazine 65 is effected by means of a key 83, as shown in FIGS. 2 and 5. For effecting rotation of the shaft 81, an elongated keyway 86 formed therein engages a key 87 constrained against movement in a suitable recess formed in the internal surface of the driving sleeve 74.

Translational movement of the storage magazine 65 is effected by means of a fixed piston 91 which is located within the upper portion of the bore of the tubular driving shaft 81. The piston 91 is secured to the end of a stationary shaft or rod 92, the lower end of which is engaged in a bearing sleeve 93 that is connected to the tubular shaft 81 for rotation with it by means of a dowel 94. The extreme lower end of the shaft 92 has a reduced threaded portion 96 which is threadedly engaged in a suitable threaded opening provided in a retaining cap 97 secured to the lower end of the driving sleeve 74.

The purpose of the storage turret or magazine 65 is to releasably store a plurality of tools 55; to move a preselected tool to a tool change location 105 in which it is axially aligned with the spindle; and, to bodily insert the preselected tool into the spindle, as previously mentioned. To this end, the storage turret or magazine 65 is provided with a plurality of sockets 106 which are equally spaced apart in an annular relationship adjacent to the periphery of the tool storage turret 65, as shown in FIG. 2. In the illustrated embodiment, twenty tool storage sockets 106 are shown to accommodate the storage of twenty tools 55. It is to be understood that twenty tool storage sockets 106 are shown as an exemplary embodiment only and other quantities may be provided to suit the requirements of a particular application.

The tool 55 has been referred to generally but, as shown in FIG. 3, comprises the cutter 62 which is releasably secured by means of a screw 102 in a tool holder or body member 108 that is adapted to fit within the bore of the spindle 26. The body member 108, as shown in FIGS. 2 and 3, comprises a piston like portion 109 of a diameter to slidably engage within the bore 111 of the spindle 26 and which serves as a piston when inserted within the bore of the spindle.

For effecting a driving engagement of the tool holder with the forward operating end of the spindle 26, the body portion of the tool 55 is provided with a gear 112 and a nose portion 113 which has a non-sticking taper adapted to engage a complementary tapered bore 114 of a spindle drive ring 115. Adjacent the tapered opening 114, the drive ring 115 is provided with a concentrically disposed internal gear 117 engageable with the tool holder gear. The tool 55 as it is inserted into the drive ring 115 is concentrically located with respect to the spindle axis by means of the engagement of the nose portion 113 in the tapered bore 114. To facilitate meshing engagement of the gears 112 and 117, the cooperating gear teeth are beveled.

As shown in FIG. 2, the drive ring 115 has an annular flange 121 which is secured within a suitable circular recess formed in the operating end of the spindle, by means of screws 122. With the tool 55 located within the operating end of the spindle 26, an annular boss 123 engages an annular shoulder 116 of the drive ring so as to form a sealed annular chamber 124 below the piston body 109, the function of which will subsequently be described.

For storing the tools 55 in the individual sockets 106 of the storage turret 65 the piston portion 109 is provided with a circular axial extending stub shaft 127 that is integrally formed with the body 108. The stub shaft 127 is provided with a plurality of resiliently biased detent mechanisms, generally identified by the reference number 128, which are releasably engageable with an annular groove 129 formed in the interior surface of each of the sockets 106. With a tool 55 stored in position in the storage magazine 65, the detent mechanisms 128 engage the annular groove 129 to retain a boss 131 presented by the body 108 in engagement with the under surface 132 of the magazine. The boss 131 of the tool 55 in cooperation with the stub shaft 127 operate to firmly maintain the tool 55 in rigid storage position in the storage turret, there being no tendency of the tool 55 to oscillate or swing while stored therein.

When the tool 55 is located in the operating end of the spindle 26 it is locked in position so that as the spindle head 22 is moved downwardly to advance the cutter 62 into a workpiece, the tool 55 will not be displaced from the operating end of the spindle. To this end, as shown in FIGS. 2 and 3, the body portion is provided with a transverse bore 136, the outer ends of which are threaded to receive a pair of threaded sleeves 137 and 138. A pair of plungers 139 and 141 are slidably disposed within the associated sleeves 137 and 138 with the inner ends of the plungers being provided with radially extending flanges 142 that are arranged to engage the axial inner face of the sleeves 137 and 138, respectively. The plungers 139 and 141 are urged radially outward to their limit of travel, as defined by the flanges 142, by means of the spring 146 which is located within the bore 136 between the inner ends of the plungers.

The outer end of each plunger is provided with a tapered locking surface 147 which cooperates with a tapered surface 148 of an annular locking groove 149 formed in the interior wall surface of the spindle 26. Thus, with the tool 55 located in the operating end of the spindle 26, the plungers 139 and 141 are urged outwardly to engage the annular groove 149 so that the locking surface 147 of the plungers cooperate with the surface 148 of the groove to lock the tool in operating position. When the storage magazine is in its elevated position, as shown by the broken lines in FIG. 2, the tool carried thereby is elevated therewith and the plungers 139 and 141 are urged outwardly by means of the spring 146. Therefore, as the storage turret is moved downwardly to insert the tool carried thereby into the spindle, the plungers 139 and 141 are in their outermost positions. To facilitate the entry of the tool into the spindle, the outer ends of the plungers engage a tapered annular surface 152, FIG. 2, of the rear portion of the spindle so that the plungers are urged radially inward within the bore 136 to permit the passage or entry of the tool 55 within the spindle. As the tool 55 moves through the bore of the spindle 26, the plungers 139 and 141, of course, will engage the wall of the spindle bore. However, the spring 146, provided to bias the plungers outwardly of the body portion 108, is not strong enough to effect a forceful engagement of the plungers with the bore surface. Thus, the plungers 139 and 141 will not restrict the movement of the tool 55 as it moves through the bore.

As previously mentioned, translational movement of the storage magazine 65 from its tool inserting position, as shown in full lines in FIG. 2, to its tool withdrawal position as shown in broken lines therein is effected by means of hydraulic pressure. The elevation of the storage turret 65 is accomplished by means of fluid pressure supplied to a chamber 156 formed on the head side of the fixed piston 91. The chamber 156 is sealed by a cap 157 having a reduced circular plug portion 158 that snugly fits within an opening formed in the hub 82 of the storage turret 65, and that compresses an O-ring 159 to seal the opening. Fluid pressure is supplied to the chamber 156 by means of an external line 163 which is operably connected to an internal passage 164 formed in the cap 157 and plug 158. The connection between the external line 163 and the internal passage 164 is effected by means of a rotating connector 166 in a well-known manner. Fluid pressure supplied to the chamber 156 will act on the fixed piston 91 to urge the tubular shaft 181 and storage magazine upwardly. With the storage magazine 65 in the elevated position, indexable rotation is effected through the axially fixed driving sleeve 74 which is slidably keyed to the drive the shaft 81.

To lower the storage magazine, fluid pressure is supplied to a lower chamber 171 formed between the interior surface of the axially movable shaft 81 and the stationary piston rod 92. Fluid pressure is supplied to the lower chamber 171 via a line 172 connected at the bottom end of the rod 92 to an internal passageway 173 formed in the rod, and terminating in a transverse opening above the upper end of the sleeve 93. Thus, with the sleeve 93 being fixed to the shaft 81, the fluid pressure supplied to the chamber 171 acts against the fixed piston 91 and reacts on axial end of the sleeve 93, to force the sleeve and thereby the shaft 81 downwardly which effects downward movemnt of the storage turret to the position it occupies, as is shown in full lines in FIG. 2.

As the storage turret 65 is lowered from tool selecting elevated position, as shown by the broken lines in FIG. 2, to its lowermost position, as shown in full lines, the preselected tool 55 located at the tool change position 105 is inserted into the rear portion of the spindle. When the magazine is in its lowermost position, the under surface 132 engages the upper end of the spindle, compressing O-ring 176, so that a tight seal is effected to form a chamber 177. Thus, the portion of the magazine 65 engaging the end of the spindle acts as a breech block for sealing the chamber.

To disengage the tool 55 from the storage turret 65 when the tool has been inserted within the spindle 26, air pressure is admitted to the chamber 177 under considerable force to urge the tool 55 from the socket 106 and to move it downwardly into position in the lower operating end of the spindle. To this end, the shaft 81 is provided with a plurality of axially extending passages 181, as shown in FIGS. 2 and 5. These axial passageways communicate with individual radial passageways 182 which communicate with the peripheral surface of the shaft and which are arranged to communicate with a plurality of individual passageways 183 formed radially in the storage turret or magazine 65. As shown in FIG. 2, the radial passageway 183 associated with the socket 106 located at the tool change position 105, communicates with the socket 106, while an angular disposed intersecting branch passageway 184 communicates directly with the chamber 177. Thus, air pressure is supplied via the radial passageway 183 to the socket 106 located at the station 105, and will also be supplied simultaneously to the top surface of the piston body 109, so that the two cooperating forces of pressure applied to the socket and to the chamber 177 will overcome the restraining action of the detents 128 to release the tool from the storage turret 65 and thereafter the air pressure will move the tool 55 downwardly into the operating end of the spindle 26.

Figure 10:
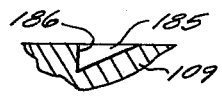

As shown in FIGS. 3, 4 and 10, the top surface of the piston body 109 of the tool 55 is provided with a plurality of milled recesses 185 arranged in annular relationship and positioned so that the air pressure admitted to the chamber 177 through the passageway 184 will impinge upon the vertical end surfaces which function as vanes 186 to impart a rotational movement to the piston as it is moving downwardly into the operating end of the spindle 26. This facilitates the meshing engagement of the gear 112 with the internal gear 117 of the spindle drive ring 115 so that positive engagement of the tool with the drive ring will be effected. When the air pressure in the chamber 177 has operated to locate the tool 55 in proper operating position in the spindle, the plungers 139 and 141 move outwardly by the operation of the spring 146 to engage in the groove 148, as previously described. However, to insure that the plungers 139 and 141 are fully engaged in the groove 149, air pressure is supplied to the bore 136 via an axial passageway 187 formed from the top surface of the stub shaft 127 and which is disposed to communicate with the bore 136. Thus, as the tool is moved to the operating end of the spindle the pressure in the chamber 177 builds up and is sequenced via the passageway 187 to the bore 136 forcing the plungers 139 and 141 outwardly to lock in the groove 149, as previously described. After the tapered plungers are fully seated to latch the tool in operating position, the spring 146 exerts sufficient force to restrain the plungers against inward movement. The relatively light spring pressure is sufficient because the complementary tapered surfaces of the locking groove and plungers provide a locking or sticking engagement to preclude axial displacement of the tool during a cutting operation.

To release the plungers 139 and 141 from locking engagement within the groove 149 and also to break the driving connection established between the tool 55 and the drive ring 115, air pressure is applied to the outer ends of the plungers and also the chamber 124. To this end, air pressure from a line 191 connected to a port 192 of a manifold or collector ring 193 is supplied to a collector groove 197 formed in the internal surface of the collector ring 193, as shown in FIGS. 2 and 3. The collector ring 193 is mounted about the periphery of the spindle 26 and is maintained stationary relative to the spindle by a screw 195 that is threadedly engaged in the wall of the spindle head 22. The screw 195 is formed with a dog 196 that is disposed in a suitable opening provided in the peripheral surface of the collector ring 193. Thus, the collector ring 193 is maintained stationary relative to the spindle 26 while the spindle 26 is free to rotate relative to the ring. A port 198 formed in the wall of the spindle communicates with the collector groove 197 and also with the locking groove 149 in which the plungers 139 and 141 engage. Thus, air pressure from the line 191 enters the collector ring 193 via the port 192 and is distributed around the periphery of the spindle by means of the collector groove 197. From the collector groove 197, the air pressure is admitted to the locking groove 149 of the spindle via the port 198 regardless of the angular position of the spindle relative to the collector ring 193.

With air pressure supplied to the locking groove 149 the plungers are forced inwardly within the piston body 109 of the tool 55 to unlock the tool. As the plungers 139 and 141 move inwardly toward each other, air in the bore 136 will be exhausted therefrom via the passageway 187 into the chamber 177. When the plunger 139 has been moved inwardly within the bore 136, the air pressure in the locking groove 149 is sequenced to the annular chamber 124 at the bottom surface of the piston body 109 via an axial passageway 204 that is formed in the plunger 139 and which communicates with a radially extending passageway 205 that, in turn, communicates with an annular groove 206 formed in the periphery of the plunger 139. When the plunger 139 is moved inwardly within the bore 136 to release the tool 55, the groove 206 will be positioned to communicate with an angular passageway 207 that is formed in the lower portion of the piston body 109 and which is arranged to communicate with the annular chamber 124 at the bottom of the piston 109. Thus, when the air pressure supplied to the groove 149 has moved the plungers 139 and 141 inwardly to release the tool 55, the air pressure will be sequenced to the annular chamber 124 via the passageways 204 and 205, the distribution groove 206 and thence via the angular extending passageway 207 to the chamber 124. This air pressure to the chamber 124 will effect the release of the tool from driving engagement with the drive ring 115 to facilitate the removal of the tool 55 from the operating end of the spindle 26.

As air pressure is being supplied to release the plungers 139 and 141, and thence is sequenced to the chamber 124 for initiating a disengaging movement of the tool 55 from driving connection with the drive ring 115, the air in the chamber 177 above the piston body 109 is being exhausted therefrom via both the branch passageway 184 and the passageway 183 in the storage turret or magazine 65. This creates a vacuum in the chamber 177 so that with the tool 55 released, and the gear 112 of the tool 55 disengaged from the gear 117 of the spindle drive ring 115, the vacuum will draw the tool 55 upwardly to the loading end of the spindle with a force sufficient to enter the stub shaft 127 into the socket 106.

With the tool 55 replaced in the socket 106 of the turret 65, the electrical control system must be conditioned for the succeeding sequences of the cycle. To this end, as the tool 55 moves upwardly into the storage turret 65 the stub shaft 127 enters into the socket 106 to engage and move an actuating plunger 214 radially outwardly of the storage turret so that the outer end 215 of the plunger 214 actuates a limit switch 217. The plunger 214 is slidable within a bore 218 that is provided with an enlarged counterbore 219 which threadedly receives a threaded plug or retainer 221 having an axial opening. A collar 222 is fixed to the plunger 214 and is movable within the counterbore 219 and is normally urged into engagement with a shoulder formed by providing the counterbore 219. Such inward biasing of the plunger 214 is accomplished by means of a spring 223 that is located within the counterbore and disposed in engagement with the inner end of the retainer 221 and the collar 222. Thus, when the tool 55 is removed from the storage turret 65, the inner end of the plunger 214 is urged inwardly into the socket 106 by the operation of the spring 223. However, when the stub shaft 127 of the tool 55 enters into the socket and is properly located therein, the stub shaft 127 operates to move the plunger 214 outwardly compressing the spring 223 so that the outer end of the plunger moves axially to engage the actuating plunger 216 of the limit switch 217 to actuate the switch indicating that a tool is returned to the storage turret. It is to be understood that separate limit switch actuating plungers (not shown) are respectively associated with each socket provided in the storage turret 65 so that as the turret is rotated in an indexing movement to locate a particular socket at the tool change position 105, the single limit switch 217 may be actuated by any preselected tool. The limit switch 217 is secured to a bracket 226 that is attached to the spindle head 22. With this arrangement, it is possible to condition the electrical system for the next sequence in a tool change cycle only when the storage turret 65 is in its lowermost position and the spindle head is in its retracted position, as shown in FIG. 2.

Air pressure for effecting a tool change is obtained from a source represented by a pump generally identified by the reference numeral 230 in FIGS. 2 and 8. The pump 230 comprises a cylinder 231 which is secured by means of a mounting bracket 232 to the tubular support 71. A piston 233 is reciprocally supported within the cylinder 231 and is provided with a piston rod 234 that extends outwardly of the right end of the cylinder 231, as viewed in FIG. 8, or the front end of the cylinder, as viewed in FIG. 2. A chamber 236 on the head side of the piston 233 is connected by means of a port 238 to a line 239, the opposite end of which is connected to a port 241 formed in the lower portion of the tubular support 71, as shown in FIG. 2. The port 241 formed in the tubular support 71 is oriented with respect to the tool change station 105 so that with the turret indexed to locate a particular socket 106 in position to align the tool carried thereby with the tool spindle 26, the port 241 will then register with a particular one of a plurality of ports 244 provided in the wall of the drive sleeve 74. The number of the ports 244 correspond to the number of the passageways 181 formed in the tubular shaft 81 and each of the ports 244 registers with a particular passageway 181, as shown in FIG. 2. Thus, when the drive sleeve 74 is rotated for indexing the turret 65, it acts as a valve to disconnect a port 244 that had been previously disposed to register with the port 241 and to connect another port 244 with the fixed port 241 of the tubular support 71. Since the individual ports 244 in the drive sleeve are adapted to register with an associated particular passageway 181 in the tubular shaft, a valving action is automatically effected upon axial movement. When the indexing movement of the turret 65 has been completed and the magazine lowered to its tool change position, the particular passageway 181 which is associated with the preselected tool storage socket 106 will then be moved into registration with the fixed port 241 via an associated port 244 formed in the drive sleeve 74.

A chamber 237 formed on the rod side of the piston 233 is connected to the collector ring 193 by means of a flexible line 191 which has one end connected to the port 192 in the collector ring while the opposite end is connected to a port 246 formed in the right end of the cylinder 231, as viewed in FIG. 8, or to the rear end of the cylinder, as viewed in FIG. 2. The flexible line 191 permits of movement of the spindle head 22 to its full limit of downward travel while maintaining the connection between the collector ring and the pump 230. For actuating the piston 233 of the pump 230, a hydraulic actuator 248 is provided for reciprocating the piston 233 within the cylinder 231. While the hydraulic actuator is illustrated for actuating the piston 233, any other suitable actuator may be employed as desired.

Figure 6:
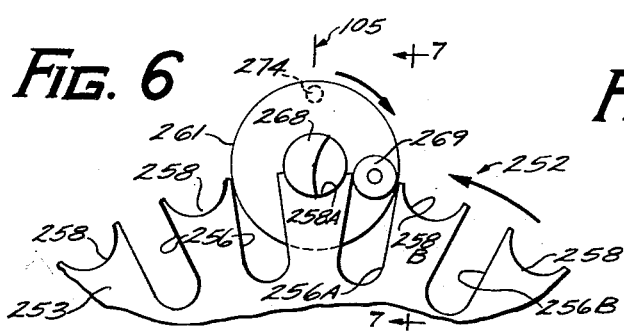
FIG. 6 is an enlarged fragmentary plan view of the Geneva index plate showing the Geneva crank in an indexed position.
Figure 7:
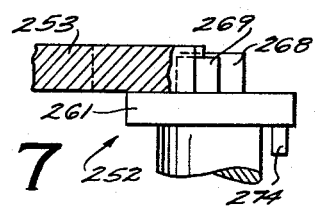
FIG. 7 is an enlarged detailed view partly in elevation and partly in vertical section of the Geneva drive mechanism taken along the plane represented by the line 7—7 in FIG. 6.

With the magazine elevated, selective indexable movement of a preselected tool may be effected by a Geneva drive mechanism 252. The drive mechanism comprises essentially an index plate 253 secured to the flange 76 of the rotatable magazine supporting sleeve 74 and a cooperating rotatable cam plate 261 affixed to a shaft 262 driven by a motor 266. The driven index plate 253 is provided with a plurality of peripherally disposed semi-circular notches 258 corresponding in number to the storage sockets 106 in the magazine 65. With a preselected tool in the ready station 165, a semi-circular notch 258A is in engagement with a cam follower 268 secured to the cam plate 261 in spaced relationship to a crank pin 269 affixed thereto. The crank pin 269 is represented in FIG. 6 as engaging the outer end of one of a plurality of radial drive slots 256 formed in the index plate 253 in alternately spaced relationship to the locating notches 258. The static condition illustrated exists at the start, or the completion, of an index movement with the spaced apart crank pin 269 and cam follower 268 respectively engaging an associated slot 256A and notch 258A formed in the index plate 253. Rotation of the cam drive plate 261 360° in a clockwise direction effects a single step advancement of the index plate 253 in a counterclockwise direction as indicated by the arrow designations. Indexable movement of the plate is terminated at the completion of 180° of rotation of the crank pin, during this interval the succeeding notch 258B being advanced for engagement by the follower. Thus, the second 180° of movement of the cam drive serves, in well-known manner, to rotate the follower into locating engagement with the notch 258B, and urge the crank pin into engagement with the succeeding slot 256B. Inasmuch as the crank pin and cam follower rotate in synchronism, it will be apparent that the concave portion of the follower clears the convex portion of the driven index plate during the initial 180° of movement.

When indexing has been accomplished, a dog 274 carried by the cam plate 261 is rotated 360° and moved to engage an actuating plunger 275 of a limit switch 276 to actuate the switch to indicate in the electrical circuit that indexing of the turret has been accomplished.

The hydraulic circuit for driving the various components described above is illustrated diagrammatically in FIG. 8 and comprises a pump 290 connected to draw hydraulic fluid from a reservoir 291. The output of the pump 290 is discharged into a pressure line 293 with the exhaust fluid being carried back to the reservoir by a return line 296.

Hydraulic pressure from the line 293 for driving the spindle motor 27 is under control of a valve 301 which is normally positioned to block the flow of fluid pressure to the spindle motor 27. When it is desired to effect rotation of the spindle 26 for performing a work operation, a solenoid coil 302 may be energized to actuate the valve which then serves to connect a pressure line 304 which is connected to pressure supply line 293 so that fluid pressure will flow through the valve into a connected line 305 and hence to the inlet port of the spindle motor 27, with the exhaust fluid flowing out of the motor into a connected line 306 connected to the exhaust port of the valve 301. The fluid exhaust from the valve 301 will be returned to the reservoir via a connected line 307 which communicates with the return line 296. When it is desired to stop rotation of the spindle 26 the solenoid coil 302 will be deenergized and the valve will be repositioned to its normal position by means of a spring 308, to block the entrance of fluid pressure to the spindle motor 27 and thereby stop rotation of the spindle 26.

The advancing and retracting movement of the spindle head 22 is under the control of a directional valve 312 which is normally positioned to block the flow of fluid pressure to the motor 58 and the flow of exhaust fluid therefrom. The valve 312 may be actuated for effecting downward movement of the spindle head 22 by energizing a solenoid coil 313. Energization of the solenoid coil 313 will position the valve so that fluid pressure from the line 293 is directed through the valve via a connecting line 314 into a connected line 315 to effect the operation of the motor 58 in a direction to move the spindle head 22 downwardly. Exhaust fluid from the motor 58 will discharge into a connected line 316 and will flow through the valve and out into a connected line 317 into the return line 296 to return to the reservoir. When the spindle head 22 has been advanced or moved downwardly a desired distance the solenoid coil 313 may be deenergized so that a spring 320 will operate to reposition the valve 312 to its normal blocking position, as shown in FIG. 8. Energization of a solenoid coil 318 of the valve will actuate the valve to connect the line 314 to the line 316 for supplying fluid pressure to the motor 58 for operating it in the opposite direction to effect an upward or retracting movement of the spindle head 22. With the valve thus conditioned, exhaust fluid from the motor 58 will flow from the motor into the connected line 315 and by means of the position of the valve 312 will flow into the connected line 317 and thence into the return line 296. In like manner, when the spindle head 22 has been fully retracted the solenoid coil 318 will be deenergized so that a spring 319 will operate to position the valve into its neutral blocking position.

The elevating and return movement of the storage magazine 65 is under the control of a direction valve 325. This valve is normally positioned so as to direct fluid pressure to the chamber 171 for maintaining the storage turret 65 in its lowermost position while the chamber 156 is connected to exhaust. The valve 325 may be actuated by energizing a solenoid coil 326 which will position the valve 325 to connect the pressure line 293 to the line 172 previously described. At this time, then, the exhaust fluid in the chamber 156 is returned to the reservoir via the line 163 which is connected to the valve 325.

To lower the storage turret 65 from elevated position, solenoid coil 326 is deenergized so that a spring 329 will operate to reposition the valve to its normal position whereby the pressure is directed to the chamber 171 while the chamber 156 is connected to the exhaust line 296. When the valve 325 is in its normal position so that fluid pressure is directed to the chamber 171 to return the storage turret 65 to its operative position, the fluid pressure will build up in the chamber 171 and thereby in the line 172, and will actuate a fluid pressure switch 332 to indicate in the electrical system that a tool change may be undertaken. On the other hand, when the valve 325 is positioned so as to direct fluid pressure to the chamber 156 to elevate the storage turret 65 upon the movement of the turret to its uppermost limit of travel, the fluid pressure built up in the line 163 will operate to actuate a connected pressure switch 333 to indicate in the electrical control system that the storage turret is in an elevated position and that rotation of the storage turret in an indexing movement may now be effected.

As previously described, the actual operation of removing the tool 55 from the storage turret 65 and engaging it in the forward operating end of the spindle 26 or of removing the tool from the operating end of the spindle and reinserting it in the storage turret 65 is effected by means of the air pump 230. The air pump 230 is operated by the fluid actuator 248 which is under the control of a valve 340. As shown in FIG. 8, with the tool storage turret 65 in lowermost position, the spindle head 22 in upward retracted position, and a tool 55 in the storage turret, inserted within the loading end of the spindle 26; the valve 340 may be operated to urge the tool downwardly by energizing a solenoid coil 341.

Energization of coil 341 operates to position the valve to direct fluid pressure from the supply line 293 to the line 343 which communicates with a chamber 342 at the right end of the cylinder of the actuator 248. With the fluid pressure directed to the chamber 342 a piston 344 within the actuator 248 will be moved to the left end of of the cylinder 343 and thereby move the piston 233 of the air pump 230 from the right end to the left end of the cylinder 231. With this action, the air pressure from the chamber 236 will be supplied to the passageway 183 provided in the storage turret 65 and also the branch passageway 184 so that the tool 55 will be forced from the turret and will be moved downwardly into the operating end of the spindle, as previously described. When the actuator piston 344 has moved its full limit of leftward travel, as viewed in FIG. 8, a dog 346 which is shown secured to a rod 347 that is attached to the piston 344, will have been moved into engagement with the actuating plunger of a limit switch 349 to actuate the limit switch and indicate in the electrical system that a tool change has been completed and will also condition the electrical circuit so that the spindle 26 may be driven in its rotary movement.

On the other hand, when it is desired to extract a tool from the operating end of the spindle 26 and return it to the storage turret 65, the solenoid coil 341 will be deenergized while an associated solenoid coil 352 will be energized to position the valve to a position, as shown in FIG. 8, so that the fluid pressure from the supply line 293 is directed to the connected line 354 and supplied to a chamber 353 on the left side of the piston 344, to move the piston 344 from the left to the right end of the cylinder. This action will cause the piston 233 of the air pump 230 to be returned from the left end of the cylinder 231 to the right end in the position as shown in FIG. 8. As the piston 233 of the pump 230 moves rightwardly, a vacuum is created in the chamber 171 of the spindle 26. At the same time, with the piston 233 of the air pump being urged rightwardly, air pressure in the chamber 237 will be supplied to the collector ring groove 149 for moving the locking plungers 139 and 141 of the piston body of the tool 55 inwardly to release the tool 55. Thereafter, the air pressure will be sequenced to the annular chamber 124 to effect initial disengagement of the tool from the drive ring 115, as previously described. With the tool 55 released and the tool disengaged from the drive ring 115, the tool will be drawn upwardly into the storage turret 65. The air pump 230 is of such capacity that the chamber 236 thereof has sufficient volume to apply a vacuum to the chamber 177 of the spindle 26 to insure that the tool when released from driving engagement with the operating end of the spindle will be withdrawn into the storage turret 65. When the tool 55 is replaced in the storage turret 65, the limit switch 217 will be actuated to indicate in the electrical system that the storage turret 65 may be elevated for effecting a tool change.

Figure 9:
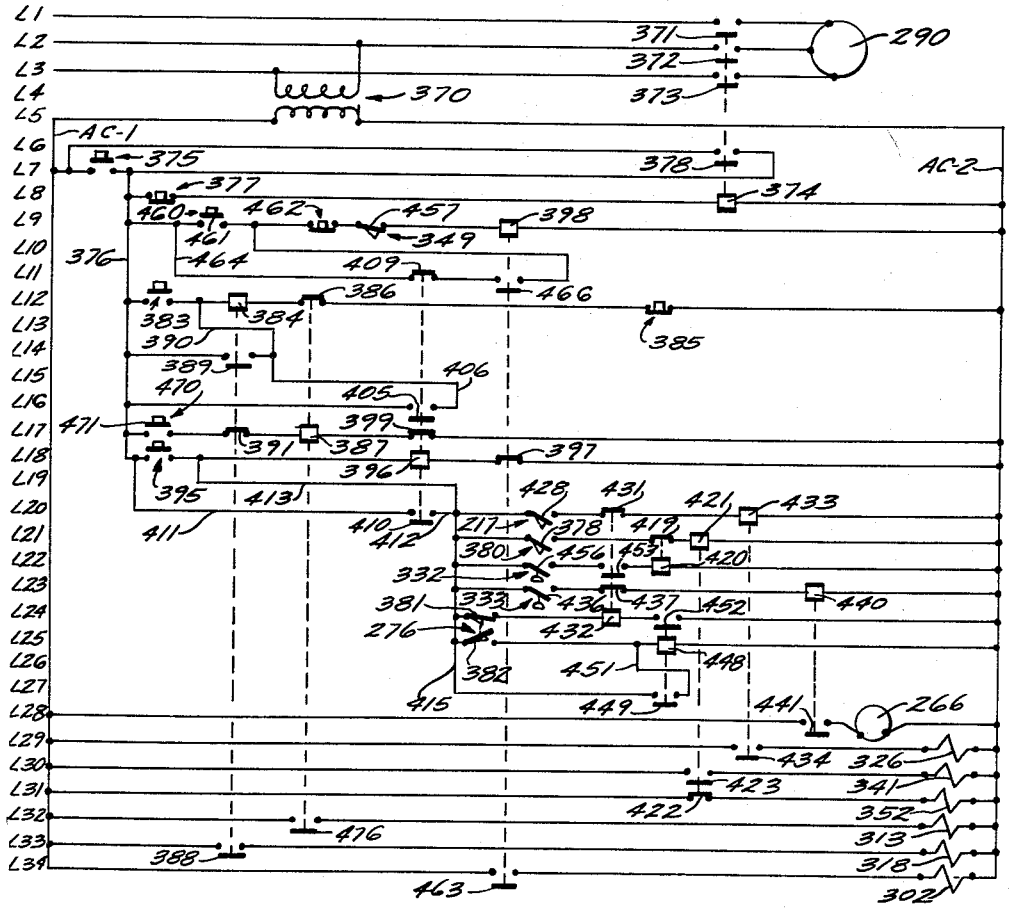
FIG. 9 is an electrical wiring diagram illustrating the control circuit for controlling the operation of the various components in completing a tool change; and, FIG. 10 is a fragmentary arcuate section through a portion of the tool holder taken along the plane represented by the line 10—10 in FIG. 4, to show a single milled recess comprising a drive vane.

The electrical control circuit for controlling machine operation is shown in the wiring diagram, FIG. 9. As there shown, the alternating current components are connected across a pair of alternating current power lines AC1 and AC2. The electrical components, as shown in the wiring diagram, are connected across the power lines in one of the plurality of reference lines that are connected across the power lines, with each of these lines being identified subsequently by the numerals L1 to L34, inclusive, so that the components may be readily located in the diagram. The control circuit is energized from a source of 3-phase current represented by the lines L1, L2 and L3 through a transformer 370 which has its primary side connected to the lines L2 and L3 while its secondary is connected to the lines AC1 and AC2, in a well-known manner. The hydraulic pump motor 290 is connected to be energized from the 3-phase source through the contacts 371, 372 and 373 of a motor start relay 374, the coil of which is shown in line L8.

The circuit is energized by closing a manually operated master start switch 375 in line L7 which operates to supply current to a vertical power line 376, shown in FIG. 9. Also, with the master start button switch 375 actuated to close its contact, a circuit is completed from the vertical conductor 376 through a master stop button switch 377, in line L8, to the coil of motor starting relay 374 and thence to the conductor AC2 to return to the transformer 370. With the coil of the relay 374 energized, it operates to close its normally open contacts 371, 372 and 373 in lines L1, L2 and L3, so that the 3-phase source of power is supplied to the motor 290 to energize it for operation. Also, with the relay 374 energized, another contact 378, in line L6 is actuated to a closed condition so that a holding circuit is established around the master start switch 375 to the vertical conductor 376. This circuit will maintain the control circuit energized upon the release of the master start switch 375.

Assume now that a tool 55 is located in the operating end of the spindle 26 and the spindle head 22 is in its lowermost position with a dog 379 secured thereto is moved out of engagement with the actuating plunger of a limit switch 380. With the limit switch 380 deactuated, its contact 378, line L21 in FIG. 9, is in normally open position. Also, as previously described, the limit switch 217, shown in line L20 is deactuated by reason of the tool 55 not being within its socket 106 in the storage turret 65. With the storage turret 65 in preselected indexed position, the limit switch 276 will also be actuated so that a contact 381 thereof, shown in line L24, is closed while an associated contact 382, in line L25, is open. With these conditions existing, a tool change cycle may be initiated by depressing a cycle start switch 395.

With the spindle head 22 in a downwardly position, the spindle head motor 58 may be operated for moving the spindle head to its uppermost position by actuating a start button switch 383, shown in line L12. With the switch button 383 actuated, a circuit is established from the energized conductor 376 along the conductor L12, to the coil of a relay 384, and thence along the conductor and through a normally closed contact 386 of a spindle head down relay 387. The circuit continues from the normally closed contact 386, in line L12, through the closed contact of a stop switch 385 and thence to the conductor AC2 to complete the circuit. With the coil of the relay 384 energized, it operates to close a normally open contact 388, in line L33, to complete a circuit from the conductor AC1 through the now closed contact 388 along the conductor L33 to the solenoid 318 of the valve 312, to energize the solenoid for positioning the valve to direct fluid pressure to the spindle head motor 58 for effecting its operation in the direction to move the spindle head in an upward direction. The energized relay 384 also operates to close a normally open contact 389, in line L14, to establish a holding circuit around the spindle head start button switch 383 to maintain the coil of the relay 384 energized when the switch 383 is released. Such circuit is established from the energized conductor 376 along the conductor of line L14, to the now closed contact 389 of the relay and thence by means of a conductor 390 to the conductor of line L12. The holding circuit continues along the line L12 through the coil of the relay 384 and thence through the remaining portion of the circuit, previously described. The relay 384 also operates to open a normally closed contact 391, in line L12, which is in the circuit for effecting the downward movement of the tool of the spindle head 22 and which will be subsequently described. The head-up circuit just described is provided for controlling the operation of the spindle head 22 independently of any other operation so that the spindle head may be moved as desired.

However, when effecting a tool change, and assuming that the spindle head 22 is in a lowered position, the head-up relay 384 will automatically be energized to retract the spindle head to its uppermost position. This automatic retraction of the spindle head is accomplished whenever the tool change start button switch 395, in line L18, is actuated to initiate both a retraction of the spindle head 22 to its uppermost position and automatically thereafter a tool change. When the tool change start button switch 395 is actuated, a circuit is completed from the energized conductor 376 through the closed contact of the switch 395 and thence along the conductor of line L18, to the coil of the relay 396, in line L18.

From the coil of the relay 396, the circuit continues along line L18 through a normally closed contact 397 of a deenergized spindle run relay 398, the coil of which is shown in line L9. The circuit continues through the normally closed contact 397 along the conductor of line L18 to the conductor AC2 to complete the circuit. With the relay 396 energized it will operate to open a normally closed contact 399 in line L17 to insure that the spindle head 22 cannot be inadvertently moved in a downwardly direction. The energized relay 396 also operates to close a normally open contact 405 in line L16. With the contact 405 closed, a circuit from the energized conductor 376 is established along line L16 through the now closed contact 405 and thence to a conductor 406 which is connected to the conductor 390. The current will continue to flow through the conductor 390 and through line L12, and thence to the coil of the relay 384 from whence it will flow through the balance of the circuit along line L12, as previously described. This automatically energizes the relay so that it operates to close its contact 388 to establish the circuit along the line L33 to the solenoid 318 for automatically operating the valve 312 for directing fluid pressure to the motor 58 for effecting its operation in a direction to move the spindle head 26 to its uppermost position, as shown in FIG. 8. Thus, the initiation of a tool change through the operation of the tool change pushbutton switch 395 automatically effects the repositioning of the spindle head 22 to its uppermost position.

The relay 396, when energized, also operates to open its normally closed contact 409 in line L11 which interrupts the circuit to the spindle run relay 398 to insure that the spindle cannot be inadvertently rotated during a tool change cycle. The relay 396, when energized also, operates to close a normally open contact 410, in line L20, to establish a holding circuit around the tool change start button switch 395 to maintain the relay 396 energized upon the release of the switch 395. Such circuit is established from the conductor 376 through a conductor 411, through the now closed contact 410 of the relay 396 and thence to a conductor 412 that is connected to a conductor 413 which is connected to the connector of line L18. The circuit then continues along the line L18 through the balance of the circuit previously described to maintain the relay 396 energized upon release of the start button 395. A vertical conductor 415 will be energized either through the conductor 413, or the holding circuit conductor 411 so that when the tool change start button 395 is released the vertical conductor 415 is also maintained energized.

With the relay 396 energized, the spindle head 22 will be retracted to its uppermost position and the dog 379, FIG. 1, on the spindle head will be moved to actuate the limit switch 380 to close its contact 378 in line L21, FIG. 9. This establishes a circuit from the energized vertical conductor 415 along line L21 to the now closed contact 378 of the limit switch 380. The current will continue on and flow through the closed contact 378 along the conductor of line L21, through a normally closed contact 419 of a deenergized relay 420, the coil of which is shown in line L22. The current will flow through the normally closed contact 419 in line L21, to the coil of a relay 421, and from the coil will flow along the line L21 to the conductor AC2 to complete the circuit for energizing the relay 421. With the coil of the relay 421 energized, it will operate to open a normally closed contact 422 in line L31 to interrupt the circuit to the solenoid 352 of the valve 340. The relay also operates to close its normally open contact 423 in line L30 to complete a circuit from the conductor AC1 along the line L30 through the now closed contact 423 of the relay 421 to energize the solenoid 341 to position the valve 340 for directing fluid pressure to the actuator 248 to operate the pump 230 for effecting the release of the tool from the operating end of the spindle 26 and withdrawing the tool 55 into the storage turret 65, as previously described.

When the tool 55 is replaced in the storage turret 65, it will operate to actuate the limit switch 217 to close its contact 428 in line L20. With the contact 428 closed, a circuit from the conductor 415 is established along the conductor of line L20 through a normally closed contact 431 of a deenergized relay 432, the coil of which appears in line L24. The circuit continues from the normally closed contact 431 along line L20 to the coil of the relay 433 and thence to the conductor AC2 to complete the circuit. With the coil of the relay 433 energized, it will operate to close a normally open contact 434 thereof in line L29. This will establish a circuit from the conductor AC1 along the conductor of line L29 through the closed contact 434 to the solenoid coil 326 of the valve 325 to energize the solenoid coil and position the valve to direct fluid pressure to the chamber 156 to effect elevation of the storage turret 65 and withdraw the tool 55 from the spindle 26. When the storage turret 65 is fully elevated, FIG. 8, the pressure in the line 163 will build up and actuate pressure switch 333 to close its contact 436 in line L23. With the contact 436 of the pressure switch 333 closed, a circuit is established from the conductor 415 along line L23, through the now closed contact 436 and a normally closed contact 437 of the deenergized relay 432 and will continue on through the coil of a relay 440 and thence to the conductor AC2. With the relay 440 actuated, it operates to close a normally open contact 441 in line L28 to complete a circuit to the Geneva motor 266. Such circuit is established from the conductor AC1 along the conductor of line L28 through the now closed contact 441 to the motor 266 and thence to the conductor AC2 to effect operation of the Geneva motor 266 for effecting an indexing movement of the storage turret 65.

As the storage turret 65 is moved in an indexing movement, the limit switch 276 is released so that its contact 381 in line L24 is released to its open position, while its associated contact 382 in line L25, is released to its normally closed position. With the contact 382 of the switch 376 closed, a circuit is established from the conductor 415 along the conductor of line L25 through the now closed contact 382 to the coil of a relay 448 and thence to the conductor AC2 to complete the circuit for energizing the relay 448. With the coil of the relay 448 energized the relay will operate to close a normally open contact 449 in line L27, to establish a holding circuit for maintaining the relay 448 energized. Such a circuit is established from the conductor 415 along the conductor of line L27 through the now closed contact 449 to a conductor 451 which is connected to a contact and through the line L25. The circuit continues through the coil of the relay 448 and thence to the conductor AC2. This circuit will maintain the relay 448 energized even though the limit switch 276 is to be actuated upon a completion of the indexing movement to open the contact 382 thereof. The energized relay 448 also operates to close another normally open contact 452 in line L24, to partially condition the circuit for energizing the relay 432.

Upon the completion of the indexing movement of the storage turret 65, the limit switch 276 is actuated again so that its contact 382 is opened while its contact 381 is closed. This would normally serve to deenergize the relay 448. However, at this time, the relay 448 is maintained energized through the holding circuit established along the conductor of line L27, the closed contact 449 and the conductor 451. Thus, the normally open contact 452, in line L24, is maintained closed so that when the limit switch 276 is actuated to close its contact 381, a circuit will be completed along the line L24 to energize the coil of the relay 432. When the relay 432 is energized it operates to open its normally closed contact 437 in line L23, to interrupt the circuit to the relay 440 which, in turn, operates to open its contact 441 in line L28 and thereby interrupt the circuit of the Geneva motor 266 to stop its operation. The energized relay 432, also, operates to open its normally closed contact 431 in line L20, so that the circuit to the relay 433 is interrupted to deenergize the relay and thereby effect an opening of its contact 434 in line L29 to interrupt the circuit in the solenoid 326 so that the valve 325 will be returned to its normal position. With the valve 325 returned to its normal position, the fluid pressure will be directed to the chamber 171 to return the storage turret to its lowermost position and insert a new tool 55 into the spindle 26.

The energized relay 432 will also operate to close a normally open contact 453 in line L22, so that when the storage turret 65 is in its lowered position a circuit may be established through the coil of the relay 420. This circuit to the coil of the relay 420 is established upon the return of the storage turret to its lowermost position wherein the fluid pressure in the line 172 builds up to actuate the pressure switch 332 which thereupon operates to close its contact 456 in line L22. With contact 456 closed, a circuit from the conductor 415 is completed along the conductor of line L22, through the now closed contact 453 of the energized relay 432 and thence to the solenoid of the relay 420 to energize the relay. This is true because the relay 448 is maintained energized as previously described, even though the limit switch 276 is actuated when the storage turret 65 is in its lowermost position.

With the relay 420 energized it will operate to open its normally closed contact 419 in line L21 to interrupt the circuit to the coil of the relay 421 to deenergize the relay. With the relay 421 deenergized it operates to open its contact 423 in line L30 to interrupt the circuit to the solenoid 341 of the valve 340. The deenergized relay 421, also, operates to close its contact 422 in line L31, to establish a circuit along the conductor of line L31 through the now closed contact 422 to the solenoid 352 of the valve 340 to actuate the valve to a position for directing fluid pressure to the actuator 248 for effecting its operation in a direction to operate the air pump 230 for supplying air pressure to the chamber 177 at the head end of the piston body of the tool 55 for moving the tool from the storage turret to the operating end of the spindle, as previously described. In accomplishing this, the operation of air pump 230 is now effecting a disengagement of the magazine locking means 128 and engagement of the spindle locking plungers 139 and 141. When the pump 230 has operated to move a new tool 55 from the storage turret 65 to the operating end of the spindle 26, the limit switch 349 will be actuated so that normally open contact 457 in line L9 is moved to a closed position. This signals that the tool is properly located in the operating end of the spindle and that the spindle may be power driven in its rotary movement.

For operating the spindle 26 in its rotary movement, a spindle start button switch 460 in line L9 may be actuated to close its contact 461 to establish a circuit to the coil of the spindle run relay 398. Such circuit is established from the conductor 376 along the conductor of line L9, through the now closed contact 461 of the spindle run start switch 460, through the closed contacts of a spindle emergency stop switch 462 and the now closed contact 457 of the limit switch 349 to the coil of the relay 398. The circuit continues along the conductor of line L9 to the conductor AC2 to energize the coil of the relay 398. With the relay 398 energized it operates to open its normally closed contact 397 in line L18, to deenergize the coil of the relay 396. The deenergized relay 396 operates to open its contact 410 in line L20, to denergize the branch supply conductor 415. With the conductor 415 deenergized both the relay 432 in line L24, and the relay 448 in line L25, are deenergized for a subsequent cycle of operation.

The relay 398 upon being energized will, also, operate to close its normally open contact 463 in line L34, to establish the circuit to the solenoid 302. Such circuit is completed from the energized conductor AC1, along the conductor of line L34, through the now closed contact 463 and thence to the solenoid 302 of the valve 301. With the solenoid 302 energized it operates to position the valve 301 for directing fluid pressure to the spindle run motor 27 for effecting its operation for driving the spindle 26, as previously described. A holding circuit is established for maintaining the relay 398 energized upon the release of the spindle run start button switch 460. Such circuit is completed from the conductor of line L9, through a conductor 464 connected to a conductor of line L11, through the now closed contact 409 of the deenergized relay 396, through a now closed contact 466 in line L11 of the energized relay 398, and thence to the conductor of line L10 back to the conductor of line L9, to bypass the spindle run start switch 460. The holding circuit then continues along the line L9, as previously described, to maintain the coil of the relay 398 energized.

With the spindle 26 rotating, the spindle head 22 may be moved downwardly to engage the cutting element 62 of the tool 55 with a workpiece. Such advancement of the spindle head 22 is effected by actuating the spindle head down switch 470 to close its contact 471 in line L17. With the contact 471 closed a circuit is completed from the conductor 376 along the conductor of the line L17, through the now closed contact 471, a normally closed contact 391 of the deenergized relay 384, to the coil of the relay 387. The circuit continues from the coil of the relay 387, through a now closed contact 399 of the deenergized relay 396, and continues to the energized conductor AC2 to energize the coil of the relay 387. With the coil of the relay 387 energized it operates to close its normally open contact 476 in line L32. With the contact 476 closed, a circuit is established from the energized conductor AC1, along the conductor of line L32, through the now closed contact 476 to the solenoid 313 of the valve 312 to energize the solenoid for positioning the valve to direct fluid pressure to the spindle head motor 58 for effecting its operation in a direction to move the spindle head downwardly. Simultaneously, with the closing of the contact 476 in line L32, the relay 387 operates to open its normally closed contact 386 in line L12, thereby interrupting the circuit to the coil of the relay 384 to deenergize the relay. The relay 384 upon being deenergized operates to open its contact 388 in line L33, to interrupt the circuit to the solenoid 318 of the valve 312. Thus, the solenoid 318 is deenergized simultaneously with the energization of the solenoid 313 so that positioning of the valve may be effected for directing fluid pressure to the motor 58, as previously described. The spindle head 22 will move downwardly as long as the head down start switch button 470 is held actuated and will stop only when the switch button is released. However, it is obvious that the positioning of the head in its downward position may be effected through limit switches [not shown], in a well-known manner, to establish the limit of downward travel of the head. However, for the purpose of simplifying the description of the electrical control circuit such limit switches have not been shown and the control and positioning of the spindle head has been described as effected by holding the spindle down start switch 470 depressed.

From the foregoing detailed description of the illustrative embodiment set forth herein to exemplify the present invention, it will be apparent that there has been provided an improved machine tool incorporating an improved tool change mechanism and having a spindle as well as a tool storage magazine which carries the supply of tools in a minimum of space with the improved tool changer operating to replace the tool in the spindle with a new tool removed from the storage magazine in a minimum period of time. Both the storage turret and spindle cooperate and function as the tool changer, thereby eliminating the requirement of a third operating member to effect a tool change.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporaed in other structural forms without departing from the spirit and scope of the invention as defined in the sub-joined claims.

The principles of this invention having now been fully explained in connection with the foregoing description, I hereby claim as my invention:

1. In a machine tool; a frame; a source of power; a spindle provided with an axial bore and having a loading end and an operating end rotatably supported by said frame and operably connected to be driven by said source of power for performing a work operation; a tool change means supported by said frame for rotational and axial movements and adapted to releasably carry a plurality of cutting tools therein; a first actuator connected to be driven by said source of power to rotate said tool change means for selectively positioning said cutting tools for insertion into the loading end of said spindle; a second actuator connected to be driven by said source of power to effect axial movement of said tool change means for inserting a selected cutting tool into the loading end of said spindle, said tool change means also operating when inserting a tool holder into said spindle to seal the loading end of said spindle; a source of air pressure operated by said source of power and operably connected to supply air pressure to the sealed end of said spindle for moving a selected cutting tool out of said tool change means and into the operating end of said spindle; means operably connected to reverse the operation of said source of air pressure to create a vacuum in the loading end of said spindle and also supply air pressure to the operating end of said spindle for moving a cutting tool from the operating end of said spindle to the loading end thereof and engage the cutting tool in said tool change means; and means for reversing the operation of said second actuator for moving said tool change means in its axial movement in the opposite direction to withdraw the cutting tool from said spindle.

2. In a tool change mechanism for changing a cutting tool of a machine tool having a frame; a source of power; a spindle connected to be rotated by said source of power and adapted to operably receive a cutting tool; an indexible cutting tool storage turret mounted on said frame for axial movement and adapted to removably carry a plurality of cutting tools; said storage turret being connected to be actuated in its axial movement by said source of power for inserting a selected cutting tool in said spindle; a source of air pressure operated by said source of power and operably connected to move the inserted selected cutting tool from said storage turret into an operable driving connection with said spindle; means connected to reverse the operation of said source of air pressure for disengaging the cutting tool from said spindle and inserting it into said storage turret; means connected to reverse the operation of said source of power to effect the axial movement of said storage turret in the opposite direction for withdrawing the cutting tool from said spindle; and means connected to move said storage turret in an indexing movement when said storage turret has been moved axially in a direction to withdraw a tool from said spindle.

3. In a machine tool; a frame; a spindle having a loading end and an operating end rotatably supported by said frame for performing a work operation and adapted to receive a cutting tool; a loading means supported by said frame and adapted to releasably carry a plurality of cutting tools said loading means being operable to selectively load the cutting tools into the loading end of said spindle, said loading means being further operable to cooperate with the loading end of said spindle to close the loading end thereof to form a chamber when it has operated to load a selected cutting tool in the loading end of said spindle; a source of pressure operably connected to the chamber to move the cutting tool from said loading means into the operating end of said spindle; and coupling means in the operating end of said spindle to receive and couple the cutting tool to the operating end of said spindle for rotation therewith so that the cutting tool may perform a work operation.

4. In a tool change mechanism for changing the cutting tool at the operating station of a machine having a frame; a source of power; a cutting tool storage turret mounted on said frame and adapted to carry a plurality of cutting tools; indexing means connected to be actuated by said source of power and operable to drive said storage turret in an indexing movement to locate a selected tool in alignment with the operating station; a source of air pressure; means connecting said source of air pressure to the operating station for moving a cutting tool located at the operating station from said storage turret and engaging the cutting tool in operative position in the operating station for the performance of a work operation.

5. In a machine tool having a relatively movable tubular tool spindle and a storage magazine disposed to store tools for insertion into said tubular spindle and in direct guidable engagement therewith, said storage magazine being bodily movable in at least two mutually perpendicular planes, power operable means connected to effect bodily movement of said magazine in two planes for bodily inserting a preselected tool into direct guidable engagement with said tubular spindle, separate tool securing means respectively disposed to secure tools in said magazine and to secure a preselected tool in said spindle, means connected to sequentially actuate said tool securing means for transferring a preselected tool from said magazine to said spindle, and second power operable means connected to move said spindle for operating the preselected tool to perform a machining operation.

6. A tool changing machine comprising a power driven tubular spindle, said spindle forming a cylinder having open ends, a tool inserting means relatively movable to insert a preselected tool into one end of said cylinder and to simultaneously seal that end of the cylinder in a manner that the inserted tool constitutes a piston, pressure operated means connectable to reversibly move the inserted tool between said inserting means and the opposite operating end of said spindle, and releasable securing means operable to secure a tool in partially projecting cutting relationship at the operating end of said spindle.

7. In a machine tool having an operating station adapted to receive a cutting tool for the performance of a work operation; a frame; a cutting tool storage turret adapted to removably carry a plurality of cutting tools and being supported by said frame for rotational and translational movements, said translated movement in one direction serving to move said storage turret to its operative position wherein it operates to place a selected cutting tool in the operating station, or a translational movement in the opposite direction moves said storage turret to its inoperative position wherein a cutting tool is removed from the operating station and said storage turret may be indexed for locating another selected cutting tool in a position to be moved into the operating station; a first power means operably connected to drive said storage turret in an indexing movement; a second power means operably connected to effect the translational movement of said storage turret to move said turret in its operative position to place a cutting tool in the operating station; and a source of air pressure operably connected to move the selected cutting tool located at the operating station from said storage turret into operating position in the operating station.

8. A machine tool including a spindle having a passage for receiving a tool at one end, wherein a tool may be received at said one end and moved along the passage into projecting position at the other end, said spindle having a rigid tapered socket for receiving a tapered end of a tool and centering it with the tool projecting and means inward of said socket for locking the tool in position.

9. A machine tool according to claim 8, including means comprising fluid pressure directed for moving the tool along said passage.

10. A machine tool according to claim 9, including means directing said fluid pressure to actuate said locking means.

References Cited by the Examiner
UNITED STATES PATENTS

| | | | |
|---|---|---|---|
| 2,883,890 | 4/59 | Fink | 77—32.7 |
| 2,952,170 | 9/60 | Hansen | 29—26 |
| 2,997,901 | 8/61 | Keck | 77—32.7 |
| 3,073,024 | 1/63 | Hutchens | 29—568 |
| 3,099,873 | 8/63 | Brainard | 29—26 |

FOREIGN PATENTS 1,236,668  6/60  France.

RICHARD H. EANES, JR., *Primary Examiner.*
WHITMORE A. WILTZ, *Examiner.*

Disclaimer 3,174,222.—*Walter M. Pohl*, Boca Raton, Fla. TOOL CHANGING MACHINE TOOL. Patent dated Mar. 23, 1965. Disclaimer filed June 26, 1972, by the assignee, *Kearney & Trecker Corporation*.

Hereby enters this disclaimer to all claims of said patent.

[*Official Gazette February 19, 1974.*]